(12) United States Patent
Chen

(10) Patent No.: US 7,746,508 B2
(45) Date of Patent: Jun. 29, 2010

(54) CONTROLLER OF SCANNING APPARATUS

(75) Inventor: Chin-Shun Chen, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 1205 days.

(21) Appl. No.: 11/330,984

(22) Filed: Jan. 12, 2006

(65) Prior Publication Data

US 2007/0127080 A1    Jun. 7, 2007

(30) Foreign Application Priority Data

Dec. 2, 2005    (TW)    ............... 94142413 A

(51) Int. Cl.
*H04N 1/04*    (2006.01)
(52) U.S. Cl. .............. 358/461; 358/474; 358/496; 358/497

(58) Field of Classification Search ............. 358/461, 358/474, 496, 497, 475
See application file for complete search history.

(56) References Cited

U.S. PATENT DOCUMENTS

2006/0268353 A1*    11/2006    Thakur ............ 358/406
2007/0058213 A1*    3/2007    Chen et al. ............ 358/474

* cited by examiner

*Primary Examiner*—Houshang Safaipour
(74) *Attorney, Agent, or Firm*—Apex Juris, pllc; Tracy M Heims

(57) ABSTRACT

A controller of a scanning apparatus is used for controlling vertical compensation of the scanned document. The controller includes a vertical compensation circuit. By compensating the image data in the vertical direction, the scanning performance is enhanced.

5 Claims, 4 Drawing Sheets

CONTROLLER OF SCANNING APPARATUS

FIELD OF THE INVENTION

The present invention relates to a controller of a scanning apparatus, and more particularly to a controller having a vertical image compensating circuit and used in an image scanner or a multi-function peripheral.

BACKGROUND OF THE INVENTION

Image scanners are widely used for scanning documents. In order to enhance the image quality, the image data of the scanned documents are usually subject to image compensation and then transmitted to computers or other data processing devices.

As known, uneven luminance of the lamp tube is likely to occur because the luminance at both ends of the lamp tube is different from the luminance at the middle portion thereof. In addition, during the process of assembling the image scanner, fabrication errors may be generated from some components such as the charge-coupled device (COD). Typically, a shading compensation method was used to compensate the image distortion due to the uneven luminance of the lamp tube and the fabrication errors.

For performing the shading compensation, the pixel data of the scanned document is multiplied by the X-axis compensation gain and the offset value is also incorporated. Depending on the positions of the pixel data for the same scan line, the X-axis compensation gain is varied. That is to say, the shading compensation is used to compensate the errors generated in the horizontal direction.

In order to shorten the warm-up time period of the image scanner, it is necessary to perform the Y-axis compensation to compensate the errors generated in the vertical direction in some circumstances.

A compensation method for compensating the errors generated in the vertical direction was disclosed in for example Taiwanese Patent No. 1243591, entitled "Compensation method of digital image data", which was filed by the same assignee. As disclosed in the patent, the luminance of the lamp tube may approach stable after the image scanner has been turned on for a certain time period. This time period is referred to the warm-up time period. The scanning operation should be performed after the luminance of the lamp tube reaches the stable state. In order to perform the scanning operation with no warm-up time period, this compensation method uses software to compensate the image data in the vertical direction. Accordingly, the pixel data for the same scan lines are multiplied by the identical compensation gain. Whereas, different compensation gains are used to compensate the pixel data for different scan lines.

For a purpose of performing the no warm-up scanning operation, it is necessary to perform the Y-axis compensation. Furthermore, the present inventors found that Y-axis compensation was also inevitable when the image scanner has been used for a long term.

Referring to FIG. 1, a plot of the luminance variation of a lamp tube is illustrated. In the initial stage from start of the image scanner, the luminance of the lamp tube is slowly increased. Later, after the image scanner has been turned on for a certain time period, e.g. t1 seconds, the luminance of the lamp tube approaches stable. Unfortunately, when the image scanner has been used for a long term, e.g. t2 seconds, the luminance of the lamp tube falls down and the scanning performance will be impaired. Under this circumstance, the Y-axis compensation should be use to compensate the image data.

In a case that the image scanner has an automatic paper feeder to successively scan 10~50 paper sheets at a time, the total time of scanning plural paper sheets is much more than that of scanning one paper sheet. In other words, unlike the scanning operation of scanning one paper sheet, it is necessary perform the Y-axis compensation when plural paper sheets are scanned.

Although the compensation method disclosed in Taiwanese Patent No. 243591 performs the Y-axis compensation by using related software, it still has some drawbacks. For example, the software should be installed in a personal computer before the scanning operation, and some users may have problem in realizing how to install the software. Furthermore, a multifunction peripheral having multiple functions in one structural unit, for example the functions of a printer, a scanner, and optionally a fax machine and/or a copy machine, may be individually operated without communication with the computer. Under this circumstance, using the computer software is not applicable to the multifunction peripheral.

In views of the above-described disadvantages of the prior art, the applicant keeps on carving unflaggingly to develop a controller of a scanning apparatus according to the present invention through wholehearted experience and research.

SUMMARY OF THE INVENTION

It is an object of the present invention to provide a controller such as an application specific integrated circuit (ASIC), of a scanning apparatus and the controller includes a vertical compensation circuit.

In accordance with an aspect of the present invention, there is provided a controller of a scanning apparatus. The controller comprises a gain compensation circuit for compensating the image data of a plurality of scan lines. Each scan line includes a plurality of pixels. The gain compensation circuit comprises a vertical compensation circuit for performing vertical compensation computations on the plurality of scan lines, and the plurality of pixels of each scan line are compensated with a same vertical gain value.

In an embodiment, the gain compensation circuit further comprises a horizontal compensation circuit for performing vertical compensation computations on each scan line with a shading compensation gain and a shading compensation offset value.

In an embodiment, the vertical compensation circuit comprises a vertical gain latch for receiving and storing the vertical gain value, a vertical register for storing the vertical gain value, a vertical counter electrically connected to the vertical register to issue a vertical pointer $V_{pointer}$ to allow synchronization of the scan lines, and a first multiplier electrically connected to the vertical register for receiving an original image data and the vertical gain value.

In an embodiment, the horizontal compensation circuit comprises an offset latch for receiving and storing the shading compensation offset value, a horizontal gain latch for receiving and storing the shading compensation gain, a horizontal counter for issuing a horizontal pointer $H_{pointer}$ to the offset latch and the horizontal gain latch to allow synchronization of the pixels for each scan line, an adder electrically connected to the first multiplier and the offset latch, and a second multiplier electrically connected to the adder and the horizontal gain latch.

In an embodiment, the shading compensation gain and the shading compensation offset value are stored in a shading table.

Preferably, the controller is included in an application specific integrated circuit of a multi-function peripheral.

Preferably, the controller is included in an application specific integrated circuit of an image scanner.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
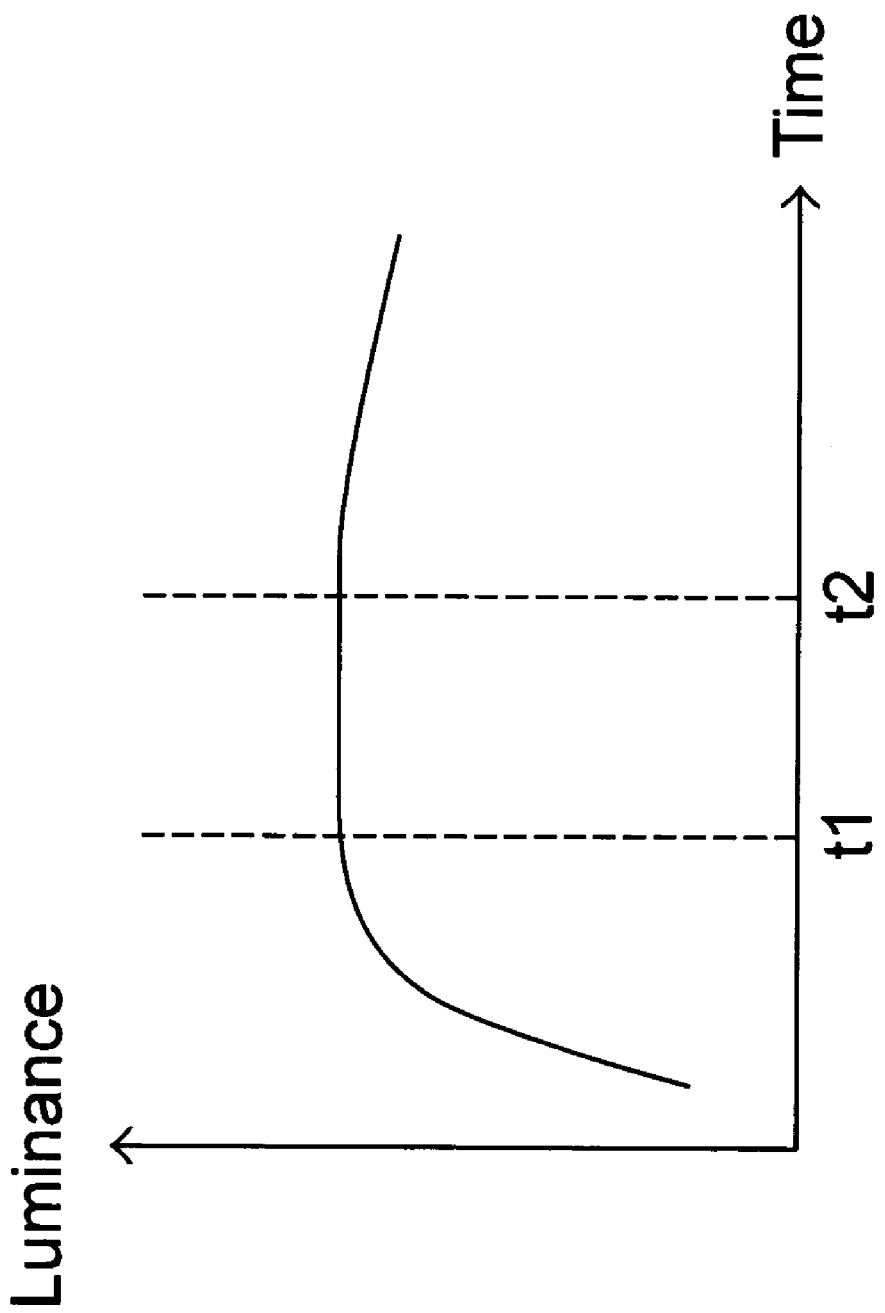
FIG. 1 is a plot illustrating the luminance variation of a lamp tube.
Figure 2:
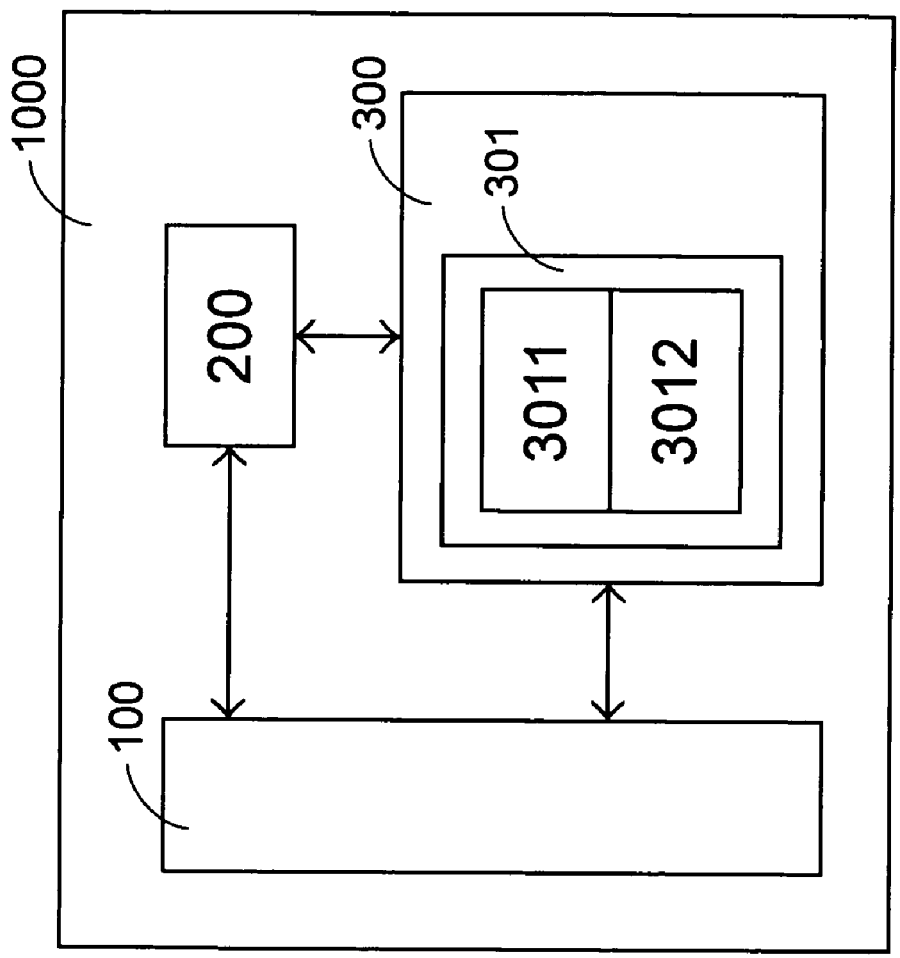
FIG. 2 is a circuit block diagram of an image scanner having a gain compensation circuit according to a preferred embodiment of the present invention.

Referring to FIG. 2, a circuit block diagram of an image scanner having a gain compensation circuit according to a preferred embodiment of the present invention is illustrated.

The image scanner 1000 of FIG. 2 comprises a scanning module 100, a driving unit 200 for driving the scanning module 100, and a controller 300. An example of the controller 300 is an application specific integrated circuit (ASIC) for controlling the scanning operation of the image scanner 1000. The gain compensation circuit 301 is included in the application specific integrated circuit 300, and comprises a vertical compensation circuit 3011 and a horizontal compensation circuit 3012.

Figure 3:
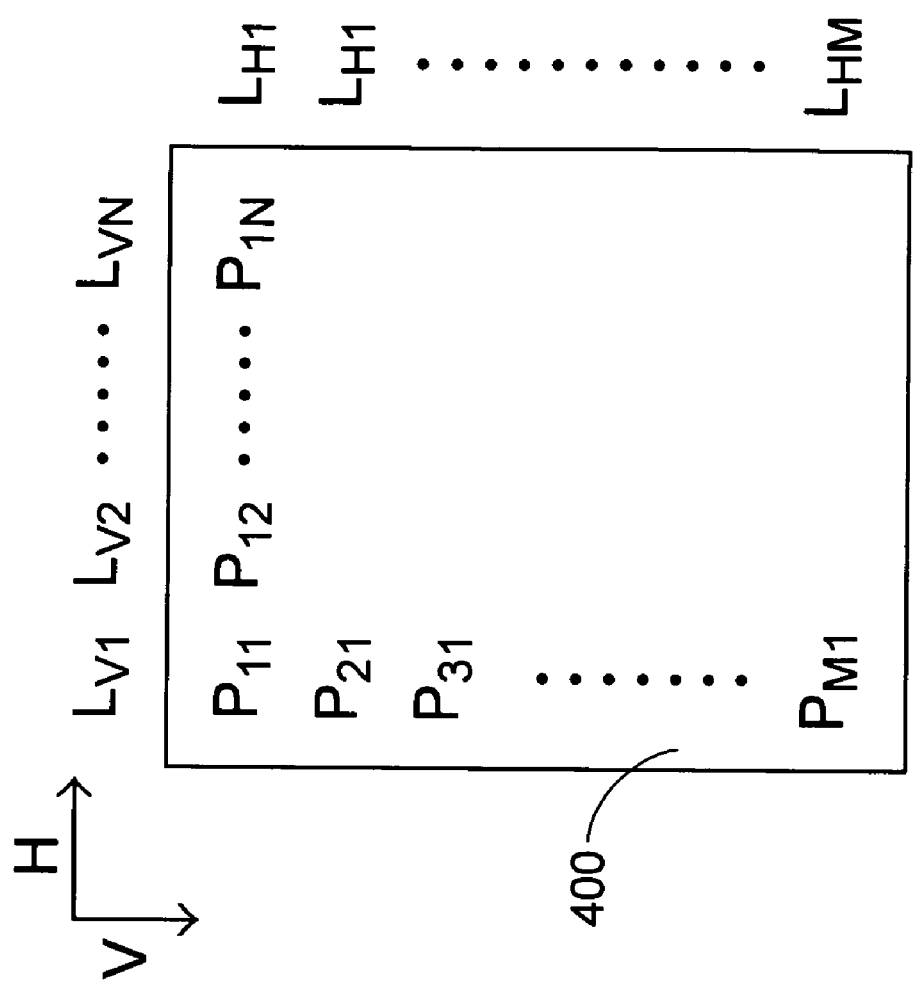
FIG. 3 is a schematic view illustrating the scan lines and the pixels of a scanned document.

Please refer to FIG. 3, which is a schematic view illustrating the scan lines of a scanned document. The scanned document 400 comprises L horizontal scan line $L_{H1} \sim L_{HM}$, and each horizontal scan line includes N pixels. In views of the vertical dimension, the scanned document 400 comprises N vertical scan lines $L_{V1} \sim L_{VN}$, and each vertical scan line includes M pixels. In other words, the first horizontal scan line $L_{H1}$ includes the pixels $P_{11} \sim P_{1N}$, and the first vertical scan line $L_{V1}$ includes the pixels $P_{11} \sim P_{M1}$. During the scanning operation, the scanning module 100 is moved in the vertical direction V to successively scan the image data of the scan line $L_{H1} \sim L_{HM}$.

Figure 4:
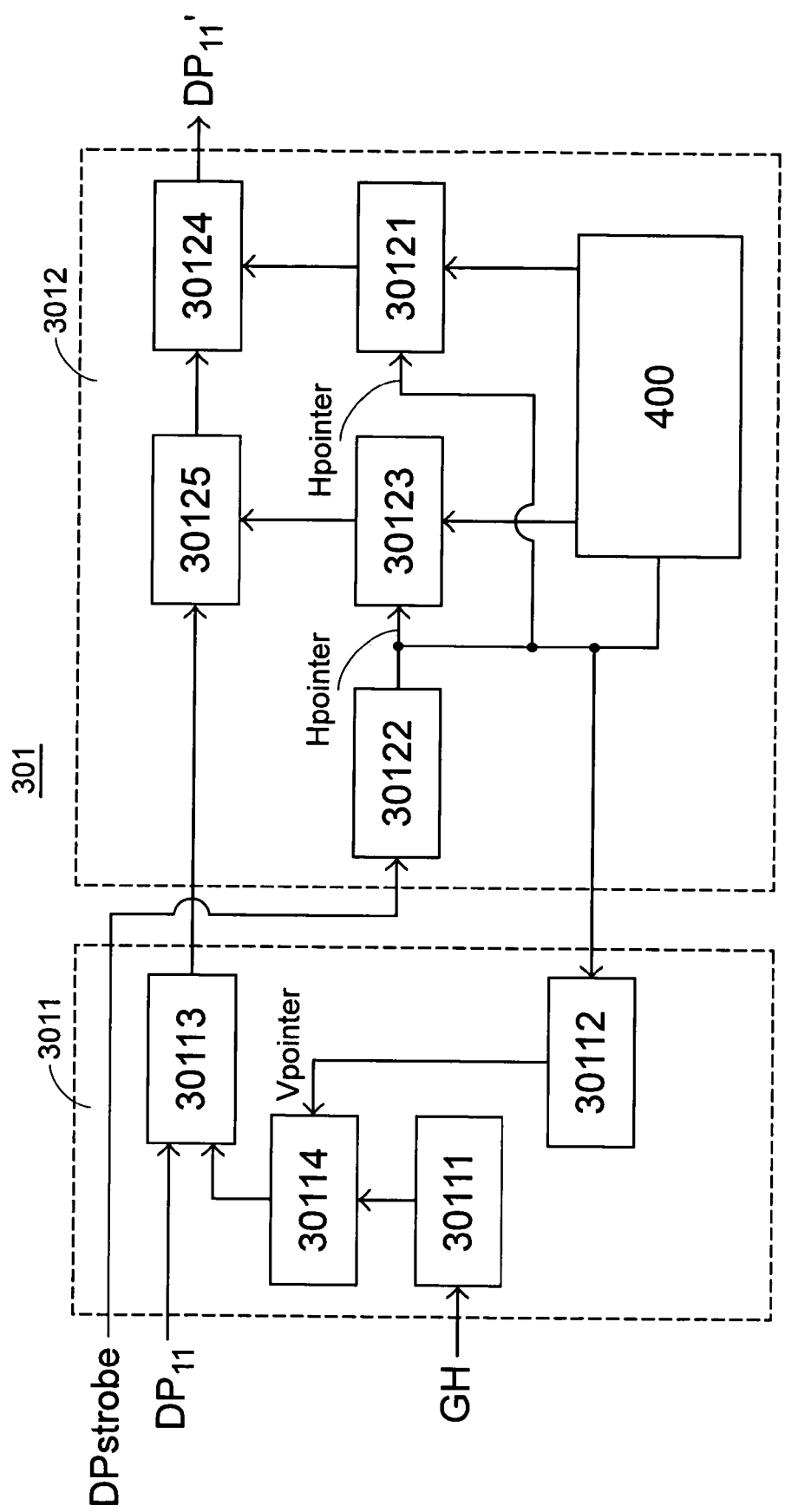
FIG. 4 is a circuit block diagram of the gain compensation circuit according to a preferred embodiment of the present invention.

Referring to FIG. 4, a circuit block diagram of the gain compensation circuit according to a preferred embodiment of the present invention is illustrated.

In FIG. 4, the gain compensation circuit 301 comprises a vertical compensation circuit 3011 and a horizontal compensation circuit 3012. The vertical compensation circuit 3011 comprises a vertical gain latch 30111, a vertical counter 30112, a first multiplier 30113 and a vertical register 30114. The vertical gain latch 30111, the vertical counter 30112 and the first multiplier 30113 are electrically connected to the vertical register 30114. In addition, the first multiplier 30113 has an input terminal for receiving the image data to be processed.

The horizontal compensation circuit 3012 comprises a horizontal gain latch 30121, a horizontal counter 30122, an offset latch 30123, a second multiplier 30124 and an adder 30125. The horizontal counter 30122 is electrically connected to a shading table 400. Depending on the pixels for each scan line, the horizontal compensation gain and the offset value, which are stored in the shading table 400, are sent to the horizontal gain latch 30121 and the offset latch 30123, respectively. The second multiplier 30124 is electrically connected to the horizontal gain latch 30121. The adder 30125 is electrically connected to the offset latch 30123 and the vertical compensation circuit 3011. The pixels are firstly processed by the vertical compensation circuit 3011 to compensate the offset value, and then transmitted to the adder 30125. Afterwards, the pixels are processed by the second multiplier 30124 to perform the horizontal gain compensation. It is preferred that the shading table 400 has been stored therein a plurality of horizontal compensation gains $G_{V1} \sim V_{VN}$ and a plurality of offset values $O_{v1} \sim O_{vN}$. In an embodiment, the horizontal compensation gains and the offset values are obtained by scanning a reference white plate.

The vertical gain latch 30111 is used to temporarily store a vertical gain value therein. A vertical pointer $V_{pointer}$ is transmitted from the vertical counter 30112 to the vertical register 30114. In response to the vertical pointer $V_{pointer}$, the vertical gain value obtained when the scanning operation is performed from one scan line to another will be stored to the vertical register 30114. By means of the first multiplier 30113, the pixel data of an original image of the scanned document is multiplied by the vertical gain value stored in the vertical register 30114, thereby implementing the vertical compensation of the pixel data.

The horizontal gain latch 30121 receives and temporarily stores a shading compensation gain from the shading table 400. The horizontal counter 30122 issues a horizontal pointer $H_{pointer}$ to the offset latch 30123 and the horizontal gain latch 30121 to allow synchronization of the pixels for each scan line. The offset latch 30123 receives and temporarily stores the offset value from the shading table 400. By means of the adder 30125, the output of the first multiplier 30113 is incorporated with the offset value. By means of the second multiplier 30124, the output of the adder 30125 is multiplied by the output of the horizontal gain latch 30121, thereby outputting the image data subject to the vertical and horizontal compensations.

The operation principle of compensating the original pixel data by using the gain compensation circuit 301 will be illustrated in more details with reference to FIGS. 3 and 4.

For example, the first pixel in the first horizontal scan line, i.e. $P_{11}$, has the original (i.e., uncompensated image data) $DP_{11}$. In addition, the vertical gain value is $G_{H1}$, the horizontal gain value is $G_{v1}$, and the offset value is $O_{v1}$.

The original image data $DP_{11}$ is inputted into the first multiplier 30113. The vertical gain value $G_{H1}$ is inputted into the vertical gain latch 30111, temporarily stored in the vertical register 30114, and then transmitted to the first multiplier 30113. The vertical counter 30112 facilitates a synchronous transfer of image data for the scan lines. After the original image data $DP_{11}$ is multiplied by the vertical gain value $G_{H1}$, the multiplied result $DP_{11} \times G_{H1}$ is outputted from the first multiplier 30113 so as to implement the vertical compensation.

The vertical compensation result $DP_{11} \times G_{H1}$ and the offset value $O_{v1}$ temporarily stored in the offset latch 30123 are inputted into the adder 30125 and added with each other, thereby obtaining the compensated image data $DP_{11} \times G_{H1} + O_{v1}$.

The output of the adder 30125 (i.e. $DP_{11} \times G_{H1} + O_{v1}$) and the horizontal gain value $G_{V1}$ temporarily stored in the horizontal gain latch 30121 are transmitted to the second multiplier 30124. The output of adder 30125 (i.e. $DP_{11} \times G_{H1} + O_{v1}$) and the horizontal gain value $G_{V1}$ are multiplied by second multiplier 30124 to generate image data $DP_{11}$, which is subject to the vertical and horizontal compensations. That is, $DP_{11}' = [DP_{11} \times G_{H1} + O_{v1}] \times G_{v1}$. Likewise, $DP_{12}' = [DP_{12} \times G_{H1} + O_{v2}] \times G_{v2}$. The rest may be deduced by analogy. $DP_{1N}' = [DP_{1N} \times G_{H1} + O_{vN}] \times G_{vN}$. $DP_{21}' = [DP_{21} \times G_{H2} + O_{v1}] \times G_{v1}$. The rest may be deduced by analogy. Likewise, $DP_{M1}' = [DP_{M1} \times G_{HM} + O_{v1}] \times G_{v1}$.

From the above description, since the application specific integrated circuit (ASIC) includes the vertical compensation circuit 3011, the pixel data after processed by the ASIC is subject to the vertical and horizontal compensations. When compared with the conventional ASIC having no vertical compensation circuit, the ASIC of the present invention is advantageous for enhancing the scanning performance and the scanning speed without increasing additional cost.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A controller of a scanning apparatus comprising:
    a gain compensation circuit for compensating the image data of a plurality of scan lines, each scan line including a plurality of pixels, characterized in that said gain compensation circuit comprises a vertical compensation circuit for performing vertical compensation computations on said plurality of scan lines, and said plurality of pixels of each scan line are compensated with a same vertical gain value and;
    wherein said vertical compensation circuit comprises a vertical gain latch for receiving and storing said vertical gain value, a vertical register for storing said vertical gain value, a vertical counter electrically connected to said vertical register to issue a vertical pointer V.sub.pointer to allow synchronization of said scan lines, and a first multiplier electrically connected to said vertical register for receiving an original image data and said vertical gain value, wherein said horizontal compensation circuit comprises an offset latch for receiving and storing said shading compensation offset value, a horizontal gain latch for receiving and storing said shading compensation gain, a horizontal counter for issuing a horizontal pointer H.sub.pointer to said offset latch and said horizontal gain latch to allow synchronization of said pixels for each scan line, an adder electrically connected to said first multiplier and said offset latch, and a second multiplier electrically connected to said adder and said horizontal gain latch.

2. The controller of a scanning apparatus according to claim 1 wherein said gain compensation circuit further comprises a horizontal compensation circuit for performing shading compensation computations on each scan line with a shading compensation gain and a shading compensation offset value.

3. The controller of a scanning apparatus according to claim 2 wherein said shading compensation gain and said shading compensation offset value are stored in a shading table.

4. The controller of a scanning apparatus according to claim 1 wherein said controller is included in an application specific integrated circuit of a multi-function peripheral.

5. The controller of a scanning apparatus according to claim 1 wherein said controller is included in an application specific integrated circuit of an image scanner.

* * * * *